United States Patent
Tejeda et al.

(10) Patent No.: US 9,951,569 B2
(45) Date of Patent: *Apr. 24, 2018

(54) THREADED CONNECTION

(71) Applicant: Tejas Tubular Products, Inc., Houston, TX (US)

(72) Inventors: Maximo Tejeda, Houston, TX (US); Maximo Tejeda, Jr., Houston, TX (US); G. Leon Starnes, Houston, TX (US); Terry Dobson, Houston, TX (US)

(73) Assignee: Tejas Tubular Products, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/529,818

(22) Filed: Oct. 31, 2014

(65) Prior Publication Data
US 2016/0123509 A1 May 5, 2016

(51) Int. Cl.
E21B 17/042 (2006.01)
F16L 15/06 (2006.01)

(52) U.S. Cl.
CPC .......... E21B 17/042 (2013.01); F16L 15/06 (2013.01)

(58) Field of Classification Search
CPC ........... F16L 15/06; F16L 15/00; E21B 17/08; E21B 17/085; E21B 17/02; E21B 17/042
USPC .................................. 285/333, 334
See application file for complete search history.

(56) References Cited

U.S. PATENT DOCUMENTS

| | | | | |
|---|---|---|---|---|
| 4,582,348 A | * | 4/1986 | Dearden et al. | 285/148.19 |
| 4,588,213 A | * | 5/1986 | Bollfrass et al. | 285/187 |
| 4,610,467 A | * | 9/1986 | Reimert | E21B 17/042 285/24 |
| 4,917,409 A | * | 4/1990 | Reeves | E21B 17/042 285/334 |
| 5,419,595 A | * | 5/1995 | Yamamoto | E21B 17/042 285/334 |
| 6,237,967 B1 | * | 5/2001 | Yamamoto et al. | 285/333 |
| 6,609,735 B1 | * | 8/2003 | Delange et al. | 285/334 |
| 8,882,157 B2 | * | 11/2014 | Chelette | F16L 15/06 285/333 |
| 2005/0248153 A1 | * | 11/2005 | Sugino et al. | 285/333 |
| 2010/0270793 A1 | * | 10/2010 | Takano et al. | 285/333 |

* cited by examiner

Primary Examiner — Gregory J Binda
Assistant Examiner — Zachary T Dragicevich
(74) Attorney, Agent, or Firm — Bushman Werner, P.C.

(57) ABSTRACT

A threaded, coupled connection having tapered, buttress-type threads, the threaded portions of the connection having a thread pitch of seven threads per inch. Preferably the pin threads of the coupled connection are pull-out threads.

15 Claims, 2 Drawing Sheets

THREADED CONNECTION

FIELD OF THE INVENTION

The present invention relates to threaded connections and, more particularly, to coupled, threaded connections for use on tubing used in the completion and workover of oil and gas wells.

BACKGROUND OF THE INVENTION

In the completion and production of an oil/gas well, it is often sometimes necessary to drill out a plug or other down hole obstruction which was used in the construction of the well. An example of this is so called fracing plugs used in fracing operations that are commonly conducted in shale formations. The fracing plugs are typically used to isolate lateral or horizontal sections of the well bore so that successive, isolated sections can be fraced to stimulate production. However, the fracing plugs must be drilled out so that the oil from the formation can flow to the well head for recovery.

In these types of workover or intervention activities, it is common to use a tubing string to drill out the plugs. In the past, this was conventionally done with work strings of tubing employing so called eight-round or LTC connections. However, in highly deviated or horizontal wells where most fracing occurs, connections employing eight-round threaded components are not sufficiently rugged enough to withstand the changing tension and compression loads that the work/tubing string undergoes.

Recognizing this problem, many operators elect to use a two-step or dual step threaded connection with a metal to metal radial seal which is an integral connection i.e., there is no coupling between the sections of tubing. While two-step, integral connections for tubing work strings are better than coupled eight-round threaded tubing strings, they are not without disadvantages. For one thing, two-step threaded connections are more expensive to manufacture and more expensive to rethread in the event of damage.

Ideally, a tubing string used in the activities described above e.g., drilling out of plugs and other well intervention techniques, would be capable of withstanding high make-up torque and could be made-up and broken-out multiple times e.g., 20 or more times, without any significant reduction in break-out torque. Such a connection would last longer and while in use would be more rugged and able to withstand the tension compression and bending loads placed on the connection especially, for example, in more acute bending modes e.g. 20 degrees per 100 feet. In particular, such a tubing string to would be resistant to the threaded connections backing-off to the point where the string separates.

SUMMARY OF THE INVENTION

In one aspect there is provided a coupled threaded connection which can withstand high make-up torque.

In another aspect there is provided a threaded, coupled connection which exhibits a break-out torque only slightly less than the make-up torque after repeated makes and breaks.

In still a further aspect there is provided a threaded, coupled connection comprised of a coupling having first and second boxes and first and second pins which are upset.

These and further features and advantages will become apparent from the following detailed description, wherein reference is made to the figures in the accompanying drawings.

BRIEF DESCRIPTION OF THE DRAWINGS

FIG. 4 is a view similar to FIG. 3 of another embodiment of a coupled, threaded connection of the present invention.

FIG. 5 is a partial, cross-sectional view of the thread form used in the threaded connections shown in FIGS. 3 and 4.

DETAILED DESCRIPTION OF PREFERRED EMBODIMENTS

The thread form used in the threaded connections of the present invention, described more fully hereafter, is particularly useful in coupled, tubing strings employed as work strings. The terms "box", "box connection(s)" and similar terms refers to a tubular member having an internally threaded section. The terms "pin", "pin connection(s)" or similar terms refers to a tubular member having an externally threaded section. It is a feature of the thread form and the threaded connections of the present invention that the threads are tapered having a taper of one inch per foot and a thread pitch of seven threads per inch. The threads used in the threaded connections of the present invention have a thread height of from about 0.042 to about 0.046 inches, particularly about 0.044 inches. Furthermore, the pin or pin connections used in the threaded connections of the present invention are "upset" meaning they have an OD adjacent the threaded sections which is greater than the OD of the pipe to which the pin connection is attached.

Figure 1:
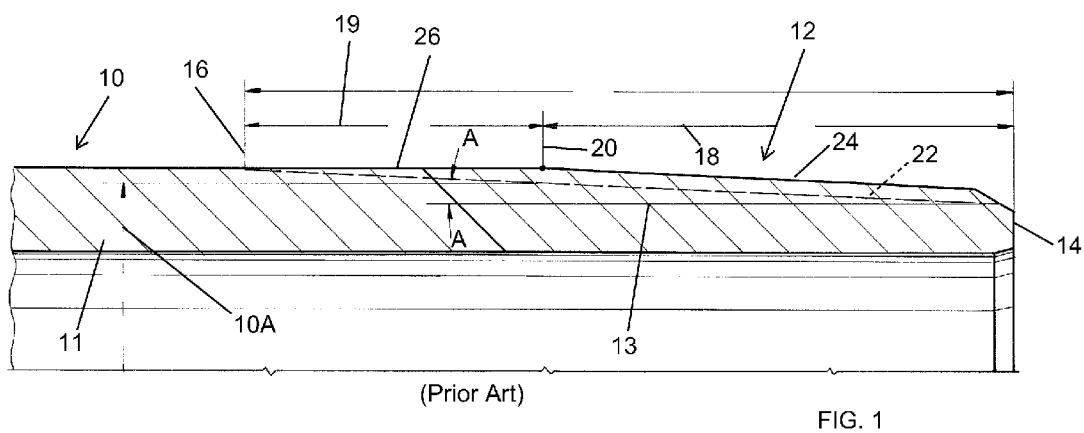
FIG. 1 is a longitudinal sectional view showing schematically the characteristics of a threaded connection having a run-out thread on a standard generally uniform O.D. pipe.

The connections of the present invention are also characterized by the fact that the pins have "pull-out" threads rather than "run-out" threads. For purposes of illustration and comparison between those two types of thread forms, reference is made to FIGS. 1 and 2. Referring first then to FIG. 1 which schematically depicts a run-out thread, it can be seen that the pin, shown generally as 10, is formed on one end of a pipe or tubular section 11 and has a threaded section shown generally as 12, the threaded section 12 extending generally from approximately the pin nose 14 to a location, indicated by the line 16 at which point the threads run-out of the pipe body 11. As is well known, a run-out thread maintains the same taper per foot (angle) with a thread height decreasing generally after about the last fully engaged full height thread at which point the thread height starts uniformly decreasing. In short, a run-out thread maintains the same taper per foot (angle) with a thread height decreasing as the thread runs out of the body. As can be seen with respect to FIG. 1, there are a series of lines and surfaces which collectively describe a run-out thread. Line 13 is an imaginary line which is parallel to the long axis of the pin 10 i.e., it is coincident with the ID of the pin 10. Dotted line 22 depicts the root of the threads while surface line 24 depicts the crests of the threads before the thread height begins to decrease which is generally in an area depicted by line 20, line 26 depicting the crests of the decreasing thread height threads until the run-out point indicated by line 16. Line 18 depicts the length of the portion of threaded section 12 where the threads are generally at full height and fully engaged, line 19 generally depicting the length of the threaded portion 12 in which the heights of the threads are decreasing. Thus as can be discerned the thread height of the threads generally between the nose 14 of the pin 10 and line 20 is the difference between dotted line 22 and surface line 24. The thread height of the decreasing thread height threads is the difference between dotted line 22 and surface line 26. Thus while the threaded section 12 extends from about the pin nose 14 to about line 16, the fully engaged full height portion of the threads extends generally from the pin nose 14 to line 20 while the decreasing thread height threads extend from about line 20 to about line 16. FIG. 1 also shows that the angle A-A of 2.39° is the thread taper which stays constant from about the nose 14 of the pin to the point 16 on the surface of the pin 10 where the threaded section 12 runs-out.

Figure 2:
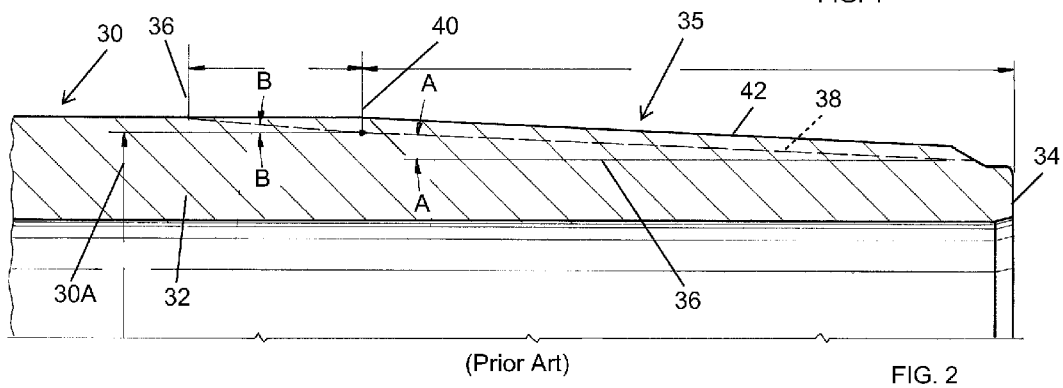
FIG. 2 is a view similar to FIG. 1 but showing the characteristics of a threaded connection having a pull-out thread on a section of a pipe having an upset O.D.

Referring now to FIG. 2, there is shown a "pull-out thread". In general, pull-out threads are characterized by the fact that they maintain the same thread height until the threaded portion reaches a set distance from the nose of the pin at which point the threads pull-out of the pipe body on a different, greater angle. With reference to FIG. 2, the pin shown generally as 30 is formed on a pipe body 32 and has a pin nose 34. There is a threaded section indicated generally as 35 which extends generally form the pin nose 34 to a point indicated by the line 36 at which point the threads pull-out of the body. As can be seen, the root of the threads of the threaded portion 35 is on two angles one being a constant angle of 2.39° (relative to the long axis of the pin 30) extending generally from pin nose 34 to a point on the pin indicated by line 40. Commencing at about line 40 the angle or taper of the threads (again relative to the long axis of the pin 30) is 4.67° as indicated by angle B-B. The height of the threads of the threaded section extending from about pin nose 34 to about line 40 is the difference between the thread root line 38 and a surface line 42 which defines the crests of the threads of that threaded portion. In short, the angle of the threads between the line 40 and the line 36 increases rather sharply from 2.39° to 4.67° as the thread pulls-out of the body 32.

As can be seen by comparing line 10A of FIG. 1 with line 30A of FIG. 2 which is a depiction of the wall thickness of the respective pins 10 and 30, pin 30 has a greater wall thickness than pin 10. Further, as shown hereafter the minimum diameter of the last engaged thread of the threaded section 35 of pin 30 is greater than the OD of the pipe body on which of pin 10 is formed.

Figure 3:
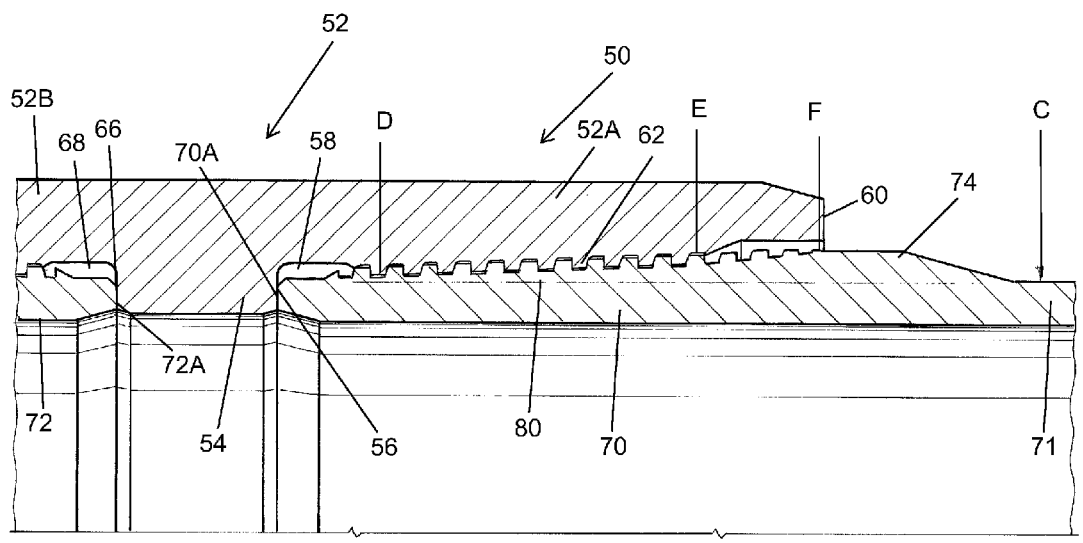
FIG. 3 is a partial, longitudinal section of one embodiment of the present invention showing a coupled threaded connection with mechanical stops or torque shoulders.

Referring now to FIG. 3 there is shown one embodiment of the present invention comprising a coupled, shouldered connection. The connection, shown generally as 50 comprises a coupling body shown generally as 52, only one end of which is shown, it being understood that the other end is the same. Coupling body 52 has an internal, annular, radially inwardly projecting rib 54, there being a first internal, annular axially facing shoulder 56 formed on rib 54. A first inwardly projecting, annular thread relief 58 is formed adjacent shoulder 56. There is a first coupling body end face 60, and a first internally threaded portion having threads 62. Accordingly there is formed a first box connection 52A generally bounded by shoulder 56 and first end face 60.

Coupling body 52 also forms a second box connection 52B having a second annular, axially facing shoulder 66 formed on rib 54 opposite shoulder 56, and a radially inwardly extending annular thread relief 68 adjacent shoulder 66, second box connection 52B being generally bounded by shoulder 66 and a second coupling body end face (not shown).

Coupled connection 50 also comprises a first pin 70 connected to a first pipe body 71 and a second pin 72 connected to a second pipe (not shown), pins 70 and 72 having first and second pin noses 70A and 72A, respectively. First pin 70 has a first upset portion 74 while second pin 72 has a second upset portion (not shown). When made-up as shown in FIG. 3, first pin 70 and second pin 72 one threadedly received in first box 52A and second box 52B, respectively, pin noses 72A and 70A being made-up to a desired torque against shoulders 56 and 66, respectively. Connection 50, as seen, has a generally flush ID.

As seen in FIG. 3, pipe body 71 has an OD of D indicated by arrow C. As also seen there is an arrow D showing the minimum diameter of the last engaged thread of pin connection 70. As can be seen from the dotted line 80, the minimum diameter of the last engaged thread indicated by the arrow D is greater than the OD of the pipe body 71 indicated by the arrow C.

The pull-out feature of threaded connection 50 can be readily appreciated by looking at the threaded area of the pin 70 bounded by the arrows E and F. As can also be seen, there is no thread of first pin 70 which extends beyond the first end face 60 of coupling body 52, a like situation existing with respect to second pin 72.

Referring now to FIG. 4 there is shown another embodiment of the present invention which comprises a coupled connection, shown generally as 90. Coupled connection 90 comprises a coupling body 92 having a centerline indicated by arrow G which is perpendicular to a longitudinally extending, product axis (not shown), concentric with coupling body 92, coupling body 92 having a first end 94 and a second end (not shown). Coupling body 92 forms a first box 96 which extends generally from first end face 94 to the center line G of coupling body 92. A female, threaded section having threads 98 extends between first end face 94 and center line G. There is also a second box 91 which is generally formed between the second end (not shown) extending generally to center line G.

Coupled connection 90 also includes a first pin 98 having an externally threaded section, comprised of threads 100. First pin 98 has a first pin nose 102. Coupled connection 90 also includes a second pin 104, comprised of threads 105. Second pin 104 has a second pin nose 106. As seen in FIG. 4, when the coupled connection 90 is fully made-up, pin noses 102 and 106 are in abutting relationship. Accordingly, the coupled connection 90 has a substantially flush internal ID.

First and second pins 98 and 104 are connected to first and second pipe bodies, only first pipe body 103 being shown. As in the case of the embodiments shown on FIG. 3 the minimum diameter of the last engaged thread of the pin connections 98 and 104 are greater than the OD of the pipe bodies e.g., pipe body 103. Also as in the case of the embodiment shown in FIG. 3, it can also be seen that the pins 98 and 104 of the coupled connection 90 are pull-out threads as described above. Likewise, there is no thread on the pins 98 and 104 which extends beyond the respective first and second end faces of coupling body 92.

FIG. 5 shows the thread form of the threads in the embodiments shown in FIGS. 3 and 4. Referring thus to FIG. 5, the thread form, shown generally as 210, is shown with respect to the threads 212 of a pin 214 threadedly engaged with the threads 216 of a box 218. Pin threads 212 have a stab flank 220, a load flank 222, a root 224 and a crest 226. Box threads 216 have a stab flank 228, a load flank 230, a root 232 and a crest 234. As seen, in the fully made-up position depicted in FIG. 5 the load flanks 222, 230 of the pin, box, respectively, are engaged, the respective crests and roots of the pin threads 212 and the box threads 216, are engaged and there is a clearance, depicted by the arrows X-X, between the stab flanks of the pin threads 212 and the box threads 216.

As can also be seen from FIG. 5, the stab flanks 220 of the pin 214 and stab flanks 228 of the box 218 are at a positive angle designated as Y-Y on FIG. 5 relative to a line passing transversely through the pin/box connection and perpendicular to the product axis 242. In this regard product axis 242 passes longitudinally through the center line of the pin/box connection and is generally concentric with the OD of the box 218 and the ID of the pin 214. Generally speaking, the angle Y-Y is from about 8° to about 12°, particularly about 10°. The load flanks 222 of the pin 214 and the load flank 230 of the box 218 when in the fully made-up position as shown in FIG. 5 are at a positive angle Z-Z of from about 2° to about 4° especially about 3° again with respect to the product axis 242.

When the pin/box connection of FIG. 5 is made-up, the clearance X-X is from about 0.002 to about 0.004 inches, particularly about 0.003 inches.

The threaded connections of the present invention using the thread form of FIG. 5 provide unexpected results in terms of a reduced degree of galling typically experienced by Standard API (8 round or LTC) threads. It is known that such Standard API threads typically undergo galling after two to three make-ups but in any event after about five make-ups. In tests conducted on threaded tubing connections made in accordance with the thread form of the present invention, and it has been found that the tubing connections can undergo up to ten or more make-and-breaks without any significant galling. This is a significant advantage since it dramatically increases the usable life of the tubing before it must be reworked or replaced altogether. Furthermore, when in use, this reduced degree of galling ensures pressure integrity.

The coupled connections of the present invention also have many advantages compared with integral/two-step connections commonly used in tubing work strings. To begin with, a typical two-step connection generally has minimal thread interference, applied torque being borne almost entirely by the load bearing shoulders, which in any event, have low break out torque compared to the make-up torque. The result is that when the connection is made-up, only the torque shoulders and metal-to-metal seals are in contact. The free running threads make virtually no contact at all and accordingly substantially all of the torque is limited to shouldering torque, the metal-to-metal seals primarily acting to hold the connection together. This is to be contrasted with the connections of the present invention which after tests involving 22 makes and breaks, showed no appreciable loss in break-out torque. This flows from the fact that when the connections of the present invention are made-up to full torque values, there is not only torque on the coupling shoulders or the pin to pin ends, there is also torque in the threads which resist backing-out.

In an actual test on a threaded connection according to the present invention the connection was initially made-up to a torque value of approximately 2,300 foot pounds and an initial break-out torque of 1,800 foot pounds. After the connection had been made-up and broken-out 22 times the final break-out torque was 1,766 foot pounds. In other words the additional stored energy which can be placed into the threaded connections of the present invention when they are fully made-up ensure only minimal loss of break-out torque after repeated makes and breaks. Tests have shown this is not the case with a typical two-step threaded connection. The threaded connection of the present invention is thus characterized, in part, by its repeatability in terms of multiple makes, and breaks with little loss in break-out torque which flows from the fact that over and above the engaged threads bearing load, the stored energy in the shoulders of the connection virtually precludes any backing out even when tubing strings employing the threaded connections of the present invention are used in highly deviated e.g., horizontal wells.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A threaded connection comprising:
    a coupling body, said coupling body having a first end face and a second end face, an axial bore extending from said first end face to said second end face, a first box connection being formed in said coupling body and extending from said first end face axially inward in said bore, a second box connection being formed in said coupling body and extending from said second end face axially inward in said bore, said first and said second box connections comprising first and second box threaded portions comprising internal, tapered buttress type first and second box threads, said first and second box threaded portions having a thread pitch of seven threads per inch;
    a first pin connection threadedly received in said first box connection, said first pin connection having a first pin nose having a first pin nose outer diameter, a first annular upset portion having a first upset outer diameter, and a first pin threaded portion between said first pin nose and said first pin upset portion, said first upset portion being contiguous said first pin threaded portion, said first pin threaded portion comprising external, tapered buttress-type first pin threads, said first pin threaded portion having a thread pitch of seven threads per inch, said first pin connection being on an end of a first tubular member portion extending axially away from said first pin nose and having a first tubular member outer diameter, said first upset outer diameter being greater than said first tubular member portion outer diameter and said first pin nose outer diameter;
    a second pin connection threadedly received in said second box connection, said second pin connection having a second pin nose having a second pin nose outer diameter, a second annular upset portion having a second upset outer diameter, and a second pin threaded portion between said second pin nose and said second pin upset portion, said second upset portion being contiguous said second pin threaded portion, said second pin threaded portion comprising external, tapered buttress type second pin threads, said second pin threaded portion having a thread pitch of seven threads per inch, said second pin connection being on an end of a second tubular member portion extending axially away from said second pin nose and having a second tubular member outer diameter, said second upset outer diameter being greater than said second tubular member portion outer diameter and said second pin nose diameter; and wherein the minimum diameters of the last engaged threads of said first and second pin connections are greater than said first and second tubular member outer diameters, respectively.

2. The threaded connection of claim 1 wherein said first and second pin threads are pull out threads.

3. The threaded connection of claim 2 wherein said coupling body has a generally centrally disposed, radially inwardly extending annular rib, an annular, axially facing first shoulder and an annular, axially facing second shoulder being formed on opposite, axial sides of said rib, said first box connection extending from said first shoulder to said first end face, said second box connection extending from said second shoulder to said second end face, wherein when said first and second pin connections are made-up in said first and second box connections, respectively, said first and second pin noses are in engagement with said first and second shoulders, respectively.

4. The threaded connection of claim 3 wherein no thread of said first and second pin threaded portions extend beyond said first and second ends of said first and second box connections, respectively.

5. The threaded connection of claim 3 wherein said first and second box threads and said first and second pin threads have load flanks and stab flanks and wherein the roots and crest of said first and second pin threads and said first and second box threads are in engagement, the load flanks of said first and second pin threads and said first and second box threads are in engagement and there is a clearance between the stab flanks of said first and second pin threads of from about 0.002 to about 0.004 inches.

6. The threaded connection of claim 3 wherein each of said first and second pin threads has a root, a crest, a stab flank and a load flank, each of said stab flanks of said first and second pin threads being at an angle of from about 8 to about 12° with respect to long axes of said first and second pin connections, respectively, each of said load flanks of said first and second pin threads being at an angle of from about 2 to about 4° with respect to long axes of said first and second pin connections, respectively, each of said first and second box threads have a root, a crest, a stab flank and a load flank, each of said stab flanks of said first and second box threads being at an angle of from about 8 to about 12° with respect to long axes of said first and second box connections, respectively, each of said load flanks of said first and second box threads being at an angle from about 2 to about 4° with respect to long axes of said first and second box connections, respectively.

7. The threaded connection of claim 3 wherein said threaded portion of said pin connection and said box connection have a thread taper of one inch per foot.

8. The threaded connection of claim 2 wherein when said first and second pin connection are threadedly received in said first and second box connections, respectively, said first pin nose abuts said second pin nose.

9. The threaded connection of claim 8 wherein no thread of said first and second pin threaded portions extend beyond said first and second ends of said first and second box connections, respectively.

10. The threaded connection of claim 8 wherein said first and second box threads and said first and second pin threads have load flanks and stab flanks and wherein the roots and crest of said first and second pin threads and said first and second box threads are in engagement, the load flanks of said first and second pin threads and said first and second box threads are in engagement and there is a clearance between the stab flanks of said first and second pin threads of from about 0.002 to about 0.004 inches.

11. The threaded connection of claim 8 wherein each of said first and second pin threads have a root, a crest, a stab flank and a load flank, each of said stab flanks of said first and second pin threads being at an angle of from about 8 to about 12° with respect to long axes of said first and second pin connections, respectively, each of said load flanks of said first and second pin threads being at an angle of from about 2 to about 4° with respect to long axes of said first and second pin connections, respectively, each of said first and second box threads have a root, a crest, a stab flank and a load flank, each of said stab flanks of said first and second box threads being at an angle of from about 8 to about 12° with respect to long axes of said first and second box connections, respectively, each of said load flanks of said first and second box threads being at an angle from about 2 to about 4° with respect to long axes of said first and second box connections, respectively.

12. The threaded connection of claim 8 wherein said threaded portion of said pin connection and said box connection have a thread taper of one inch per foot.

13. A threaded connection comprising:
a coupling body, said coupling body having a first end face and a second end face, an axial bore extending from said first end face to said second end face, a first box connection being formed in said coupling body and extending from said first end face axially inward in said bore, a second box connection being formed in said coupling body and extending from said second end face axially inward in said bore, said first and said second box connections comprising first and second box threaded portions comprising internal, tapered buttress type first and second box threads, said first and second box threaded portions having a thread pitch of seven threads per inch;
a first pin connection threadedly received in said first box connection, said first pin connection having a first pin nose, a first upset portion, and a first pin threaded portion between said first pin nose and said first pin upset portion, said first pin threaded portion comprising external, tapered buttress-type first pin threads having a last engaged thread proximal said first pin nose, said first pin threaded portion having a thread pitch of seven threads per inch, said first pin connection being on an end of a first tubular member portion extending in a direction axially outwardly from said first pin upset portion and having a first outer diameter;
a second pin connection threadedly received in said second box connection, said second pin connection having a second pin nose, a second upset portion, and a second pin threaded portion between said second pin nose and said second pin upset portion, said second pin threaded portion comprising external, tapered buttress type second pin threads having a last engaged thread proximal said second pin nose, said second pin threaded portion having a threaded pitch of seven threads per inch, said second pin connection being on an end of a second tubular member portion extending in a direction axially outwardly from said second pin upset portion and having a second outer diameter;

wherein said first and second pin threads are pull out threads; and wherein the minimum diameters of said last engaged threads of said first and second pin connections are greater than said first and second outer diameters of the first and second tubular members, respectively.

14. A threaded connection comprising:

a coupling body, said coupling body having a first end face and a second end face, an axial bore extending from said first end face to said second end face, a first box connection being formed in said coupling body and extending from said first end face axially inward in said bore, a second box connection being formed in said coupling body and extending from said second end face axially inward in said bore, said first and said second box connections comprising first and second box threaded portions comprising internal, tapered buttress type first and second box threads, said first and second box threaded portions having a thread pitch of seven threads per inch;

a first pin connection threadedly received in said first box connection, said first pin connection having a first pin nose, and a first pin threaded portion, said first pin threaded portion comprising external, tapered buttress-type first pin threads having a last engaged thread proximal said first pin nose, said first pin threaded portion having a thread pitch of seven threads per inch, said first pin connection being on an end of a first tubular member portion extending axially outwardly from said first pin threaded portion and having a first outer diameter;

a second pin connection threadedly received in said second box connection, said second pin connection having a second pin nose, and a second pin threaded portion between, said second pin threaded portion comprising external, tapered buttress type second pin threads having a last engaged thread proximal said second pin nose, said second pin threaded portion having a thread pitch of seven threads per inch, said second pin connection being on an end of a second tubular member portion extending axially outwardly from said second pin threaded portion and having a second outer diameter;

wherein said first and second pin threads are pull out threads; and wherein the minimum diameters of said last engaged threads of said first and second pin connections are greater than said first and second outer diameters of said first and second tubular members, respectively.

15. A threaded connection comprising:

a coupling body, said coupling body having a first end face and a second end face, an axial bore extending from said first end face to said second end face, a first box connection being formed in said coupling body and extending from said first end face axially inward in said bore, a second box connection being formed in said coupling body and extending from said second end face axially inward in said bore, said first and said second box connections comprising first and second box threaded portions comprising internal, tapered buttress type first and second box threads, said first and second box threaded portions having a thread pitch of seven threads per inch;

a first pin connection threadedly received in said first box connection, said first pin connection having a first pin nose, and a first pin threaded portion, said first pin threaded portion comprising external, tapered buttress-type first pin threads having a last engaged thread proximal said first pin nose, said first pin threaded portion having a thread pitch of seven threads per inch, said first pin connection being on an end of a first tubular member portion extending axially outwardly from said first pin threaded portion and having a first outer diameter;

a second pin connection threadedly received in said second box connection, said second pin connection having a second pin nose, and a second pin threaded portion between, said second pin threaded portion comprising external, tapered buttress type second pin threads having a last engaged thread proximal said second pin nose, said second pin threaded portion having a thread pitch of seven threads per inch, said second pin connection being on an end of a second tubular member portion extending axially outwardly from said second pin threaded portion and having a second outer diameter; and wherein the minimum diameters of said last engaged threads of said first and second pin connections are greater than said first and second outer diameters of said first and second tubular members, respectively.

* * * * *